United States Patent [19]

Hillmann

[11] 3,827,006
[45] July 30, 1974

[54] BUS BAR CONNECTION
[75] Inventor: Willi Hillmann, Kamen, Germany
[73] Assignee: Paul Vahle KG, Kamen, Germany
[22] Filed: June 5, 1972
[21] Appl. No.: 259,688

[30] Foreign Application Priority Data
June 5, 1971 Germany............................ 7121818

[52] U.S. Cl.............................. 339/21 R, 339/22 B
[51] Int. Cl............................................... H01r 9/00
[58] Field of Search............ 339/19, 20, 21 R, 21 T, 339/22 R, 22 B, 23, 24; 52/584; 174/71 R, 71 B, 84 S; 287/64

[56] References Cited
UNITED STATES PATENTS
2,468,614   4/1949   Carlson.............................. 287/64 X
2,653,991   9/1953   Dyer et al. ........................ 339/22 B
2,883,637   4/1959   Born.................................. 339/22 B
3,081,442   3/1963   Platz ..................................... 339/14
3,289,375   12/1966  Cline.................................... 52/593
3,391,378   7/1968   Fisher................................ 339/22 B
3,496,518   2/1970   Neumann et al................. 339/21 R
3,546,367   12/1970  Hart et al.......................... 339/21 X
3,622,938   11/1971  Ito et al............................ 339/21 R Primary Examiner—Bobby R. Gay
Assistant Examiner—Robert A. Hafer

[57] ABSTRACT

For connecting bus bar sections, which are formed of conducting strips arranged in a channel shaped insulating member, the successive strips are connected by bending the ends of the strips upwardly in a direction opposite the opening into the channel at right angles and connecting the angular parts by bolts. The connection may be enclosed in a casing, through which a lead-in may be connected to the bolt and thereby to the parts of the bus bar.

8 Claims, 3 Drawing Figures

BUS BAR CONNECTION

BACKGROUND OF THE INVENTION

1. Field of the Invention

The invention relates to an arrangement for connection of successive parts of a bus bar. It is particularly related to a bus bar with a profiled insulating carrier for the supply of power to movable current utilization devices, which are electrically connected with the bus bar by a lead wire and a current collector, movable along and in contact with the bus bar.

2. The Prior Art

Such bus bars are assembled from bus bar parts of limited length. The electrical connection of the successive bus bar parts through contact alone is too uncertain. With other profile shapes of bus bars, the plug principle is used, which however is poorly adapted to shaped cross sections. It is also known to make the electrical connection of successive bus bar parts by using a so-called bridge. This type of connection requires however, especially in a bus bar arrangement in a protective housing, recesses in the wall of the protective housing or projecting ends of the bus bar parts, if importance is given to a completely flat contact surface between the bus bar and the current collector, which is a prerequisite for the smooth movement of the current collector.

SUMMARY OF THE INVENTION

According to the present invention an arrangement is provided in which the contacting ends of the bus bar parts on the side opposite the side engaged by the current collector are bent outward at right angles, so that the possibility is offered to connect the successive bus bar parts in a very simple fashion through the bent out ends, for example by bolts. The novel connection makes it certain that the contact surface between the bus bar and the current collector is completely flat, so that a smooth travel of the current collector results.

In order that, with a bus bar enclosed in a protective housing, the successive housing parts can contact each other, in a further development of the invention recesses are provided in the cross pieces of the protective housing parts in the rear side of the parts.

For ensuring protection of the contact in the connected position of the bus bar enclosed in the protective housing, a protective casing is provided on the outside of the protective housing at the point of connection of the bus bar parts.

The connection according to the invention serves in addition for the supply of current. If the connection position is contact protected, in the casing provided therefor advantageously an input opening for the connection is provided.

DESCRIPTION OF THE PREFERRED EMBODIMENTS

Figure 1:
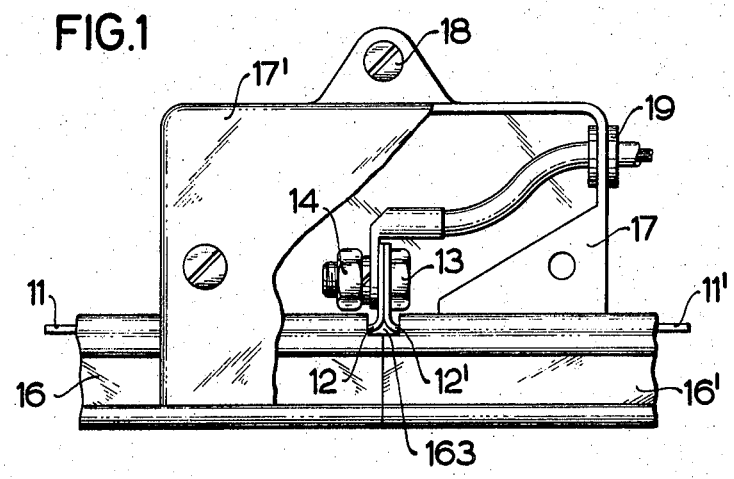
FIG. 1 shows a device according to the invention in side elevation, with the protection casing partly broken away.
Figure 2:
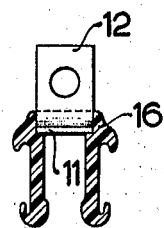
FIG. 2 is an end view of a bus bar part mounted in a protective housing.
Figure 3:
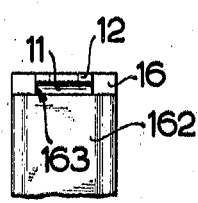
FIG. 3 is a plan view of the free end of the bus bar part in FIG. 2.

The bus bar parts, 11,11', which are made of a material of good electrical conductivity such as copper, are of substantially greater width than thickness and are mounted in a channel shaped protective housing 16 of insulating material, with the wide face of the bus bar exposed at the bottom of the channel through the longitudinally extending opening. The bus bar parts have ends 12,12' bent up from them at right angles thereto and lying in planes transverse to the longitudinal axis of the bus bar parts. The bent ends of the successive bus bar parts 11,11' are in the case shown connected with each other through a releasable bolt 13,13'.

The cross pieces 162 of the successive channel like protective housing parts 16,16' are cut away at the back side of the protective housing parts. There results a gap 163 for the bent ends 12,12' of the bus bar parts 11,11' in the protective housing parts 16,16', so that the housing parts can contact one another.

For the protection of the connecting parts, an additional protective casing formed of two parts 17,17' is provided, which grips over the protective housing parts 16,16' for the bus bar parts 11,11' and is fixed in its position with reference to the housing parts by screw connection, such as 18.

The invention can, as in the case shown, simultaneously serve as a connection for the current supply. For this purpose in the protective housing 17,17' an opening 19 for the lead wire is provided.

I claim:

1. A bus bar part comprising a profiled insulated housing having a longitudinally extending opening along one side thereof for a current collector movable along the part, said opening located opposite a back side of said housing, and a conducting strip of substantially greater width than thickness within the housing having its wider face parallel with said back side, said strip having at least one end bent away from said opening at a substantial angle and lying in a plane transverse to the longitudinal axis of the conducting strip, and extending through said back side of said housing for engagement with a complimentary bent end of the conducting strip of an adjoining bus bar part.

2. A bus bar part as claimed in claim 1, in which said angle is a right angle.

3. A bus bar part as claimed in claim 2, in which both ends of the conducting strip are bent in a direction away from the opening.

4. A bus bar comprising a plurality of parts as claimed in claim 3, and releasable means connecting the bent ends of the strips of successive parts to each other.

5. A bus bar as claimed in claim 4, in which said connecting means is a bolt.

6. In a bus bar part as claimed in claim 2, in which said protective profile includes a web, the web being cut away at each end of the bus bar part and the bent ends of the conductive strip extending through the openings thereby provided.

7. In a bus bar formed of a plurality of parts as claimed in claim 2, a protective housing formed of a plurality of parts clamped against the sides of said shaped strip and enclosing the connected bent ends of successive bus bar parts.

8. In a bus bar as claimed in claim 7, a lead-in through said housing connected to said bent ends.

* * * * *